United States Patent [19]
Dechavanne

[11] 3,980,309
[45] Sept. 14, 1976

[54] TWO-PART SCRAPER-TYPE SHAFT-SEAL

[76] Inventor: Jacques Dechavanne, 3, Boulevard de Jomardier, Saint Egreve, Isere, France

[22] Filed: Dec. 19, 1974

[21] Appl. No.: 534,275

[30] Foreign Application Priority Data
Dec. 19, 1973 France ............................. 73.45528

[52] U.S. Cl. ................................ 277/24; 277/165; 277/178; 277/184
[51] Int. Cl.² .......................................... F16J 15/32
[58] Field of Search ............ 277/24, 178, 165, 179, 277/181, 182, 184

[56] References Cited
UNITED STATES PATENTS

| | | | |
|---|---|---|---|
| 2,183,004 | 12/1939 | Boyd | 277/184 |
| 2,797,944 | 7/1957 | Riesing | 277/179 |
| 3,106,405 | 10/1963 | Pringle | 277/184 X |
| 3,147,983 | 9/1964 | Neuman et al. | 277/165 X |

FOREIGN PATENTS OR APPLICATIONS

| | | | |
|---|---|---|---|
| 1,909,530 | 9/1970 | Germany | 277/24 |
| 1,268,371 | 3/1972 | United Kingdom | 277/152 |

*Primary Examiner*—Samuel B. Rothberg
*Attorney, Agent, or Firm*—Karl F. Ross; Herbert Dubno

[57] ABSTRACT

A scraper-type shaft seal comprises an outer C-section ring which is received in an inwardly open groove in a housing and which itself receives the outer periphery of an inner ring formed with a lip which engages the outer surface of a shaft to be sealed. One of the rings is formed of flexible hard material and the other of the rings is relatively supple so that the lip of the inner ring can readily follow lateral deflections of the shaft. The outer surface of the outer ring is generally frusto-conical so that when fit into a cylindrical groove the lip is prestressed inwardly.

1 Claim, 1 Drawing Figure

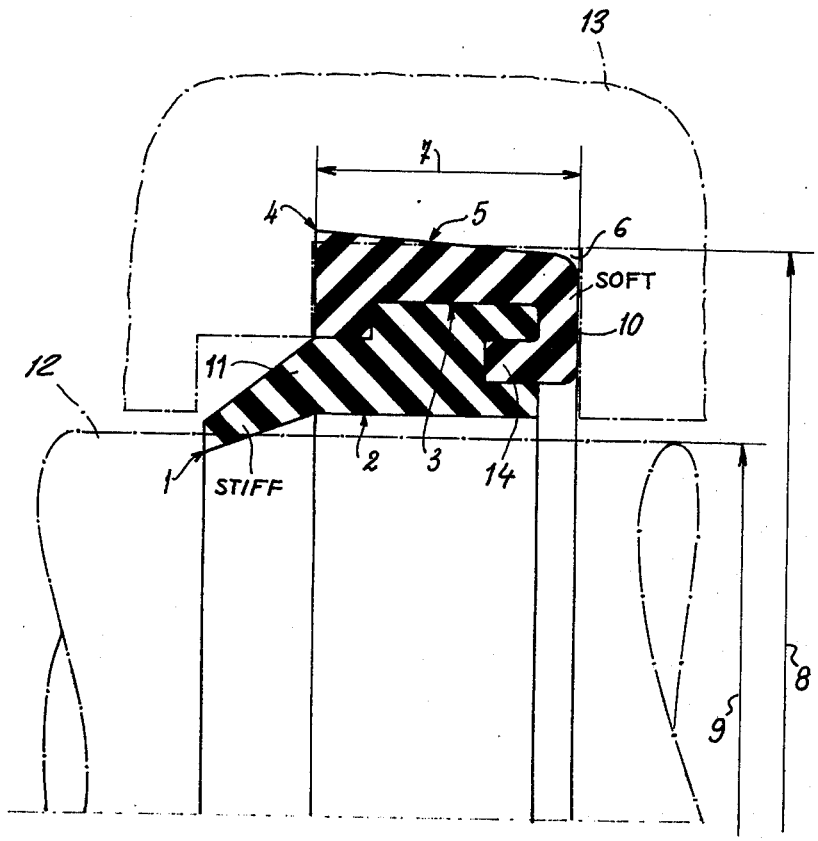

TWO-PART SCRAPER-TYPE SHAFT-SEAL

CROSS-REFERENCE TO RELATED APPLICATIONS

This application is related to my copending patent application Ser. No. 471,909 filed on May 21, 1974, (now U.S. Pat. No. 3,980,252 and to my commonly filed patent applications Ser. Nos. 534,164, and 534,165.

FIELD OF THE INVENTION

This invention relates to a dynamic shaft or piston seal. More particularly this invention concerns a scraper-type seal usable between a fixed housing and a shaft which rotates and/or is displaced longitudinally.

BACKGROUND OF THE INVENTION

Three major types of shaft seals are known. The first principal type comprises a simple compression seal having an annular elastic body which is fitted tightly within a groove that is substantially smaller in cross-section than the body so that the body is pressed against the shaft to be sealed. Wiper-type seals are also known having a portion which is urged by a spring-steel element against the surface of the shaft. A third type comprises an elastomeric body molded around a spring-steel core which is mounted under pressure in an inwardly open groove in a housing.

In many of these seals the contact lip which rides directly on the shaft of the piston is formed of supple material which, although assuring good wiping of the shaft, is rapidly destroyed when abrasive impurities come between the lip and the shaft. Thus the service life of such seals is limited under most circumstances.

Another disadvantage of most of these arrangements is that they are unable to compensate for lateral displacement of the shaft in the housing. Thus if the shaft moves slightly from side to side as it reciprocates and/or rotates, leakage is certain to occur. Should the shaft or piston deform leakage is also a certainty.

OBJECTS OF THE INVENTION

It is therefore an object of the present invention to provide an improved seal.

Another object is the provision of an improved scraper-type seal which has a long service life and is capable of compensating for lateral deflections of a shaft or piston.

SUMMARY OF THE INVENTION

These objects are attained according to the present invention in a scraper-type seal which is formed of an inside annular element having a wiping lip in contact with the shaft and having an outside periphery fixed in an outer annular element which is received in the inwardly open groove of the housing. The inner ring is formed of hard but flexible material and the outer ring is constituted of supple material or vice versa such that the wiping lip can readily follow lateral displacement of shaft relative to the housing.

In accordance with yet another feature of this invention it is possible to use such a seal in a pneumatic cylinder or a low-pressure hydraulic cylinder.

BRIEF DESCRIPTION OF THE DRAWING

The above and other objects, features, and advantages will become more readily apparent from the following, reference being made to the accompanying drawing whose sole figure is an axial section through a seal in accordance with the present invention.

SPECIFIC DESCRIPTION

The seal according to the present invention is adapted to be fitted in a groove 6 formed in a housing 13 (dot-dash lines) and is adapted to engage the outer surface of a cylindrical shaft 12 (dot-dash lines). The seal basically comprises an outer ring 10 received in a groove 6 and an inner ring 11 in the outer ring 10 and having a lip 1 engaging the outer surface of the shaft 12. Both of these annular elements are formed of a polyurethane elastomer, but the inner ring 11 is substantially stiffer than the outer ring 10.

The outer element 10 is of C-section and has an outer surface 5 which is frustoconical and of a length 7 equal to the overall length of the groove 6. Groove 6 is generally cylindrical and has a diameter 8 which is less than the diameter of the leading edge 4 of the outer ring 10 so that when this ring 10 is fitted in groove 5 it will be deformed elastically slightly inwardly. In addition this outer ring 10 is formed at its back edge with an underlying lip received in a corresponding axially open groove in the back edge of the inner ring 11. Thus the inner ring 11 is mortised into the element 10.

The inner ring 11 has an inner periphery 2 exclusive of the lip 1 which is of slightly greater diameter than the diameter 9 of the shaft 12. Normally the lip 1 lies within the profile of the shaft 12 so that it is prestressed against the outer surface of this shaft 12.

In accordance with the present invention it is also possible to use a relatively soft inner ring 11 and a relatively stiff outer ring 10.

I claim:

1. A scraper-seal fittable into an inwardly open groove for engaging the outer surface of a shaft, said seal comprising:

a supple and elastomeric outer ring receivable in said groove; and a hard but flexibly elastomeric inner ring of substantially greater stiffness than said outer ring and having an outer periphery secured in said outer ring and an inner periphery formed as a lip defined by two frustoconical surfaces engaging said surface of said shaft, said lip tapering toward said shaft, said outer ring being of C-section and receiving said outer periphery of said inner ring, said outer ring having an outer surface which is normally frustoconical, the frustoconical outer surface of said outer ring being of greater diameter than the axial end thereof opposite to said lip, said inner ring having an inner periphery of greater diameter than the outer surface of said shaft, and said lip having an inner diameter smaller than said outer diameter of said shaft.

* * * * *